United States Patent
Wu et al.

(10) Patent No.: US 12,287,562 B2
(45) Date of Patent: *Apr. 29, 2025

(54) DRIVING MECHANISM

(71) Applicant: TDK TAIWAN CORP., Taoyuan (TW)

(72) Inventors: Tso-Hsiang Wu, Taoyuan (TW); Yung-Yun Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 103 days.

This patent is subject to a terminal disclaimer.

(21) Appl. No.: 18/303,295

(22) Filed: Apr. 19, 2023

(65) Prior Publication Data

US 2023/0333446 A1   Oct. 19, 2023

Related U.S. Application Data

(60) Provisional application No. 63/332,424, filed on Apr. 19, 2022.

(51) Int. Cl.
| | | |
|---|---|---|
| G03B 9/06 | (2021.01) | |
| F03G 7/06 | (2006.01) | |
| G03B 7/10 | (2021.01) | |
| G03B 9/22 | (2021.01) | |
| H02K 41/035 | (2006.01) | |
| G03B 13/36 | (2021.01) | |

(52) U.S. Cl.
CPC ............ *G03B 9/06* (2013.01); *F03G 7/0614* (2021.08); *G03B 7/10* (2013.01); *G03B 9/22* (2013.01); *H02K 41/0354* (2013.01); *G03B 13/36* (2013.01)

(58) Field of Classification Search
CPC .... G03B 9/06; G03B 9/22; G03B 2205/0076; F03G 7/0614
See application file for complete search history.

(56) References Cited

U.S. PATENT DOCUMENTS

2020/0264495 A1 *  8/2020  Zhuo ..................... G03B 9/06
2023/0333447 A1 * 10/2023  Wu ........................ G03B 9/22

FOREIGN PATENT DOCUMENTS

KR       20200009822 A  *  1/2020  ............... G03B 9/02
WO   WO-2022228238 A1  * 11/2022  ............. G02B 5/005

* cited by examiner

*Primary Examiner* — Christopher E Mahoney
(74) *Attorney, Agent, or Firm* — Muncy, Geissler, Olds & Lowe, P.C.

(57) ABSTRACT

A driving mechanism for moving an optical unit is provided, including a fixed part, a movable part, and a driving unit. The movable part is connected to the optical unit and the fixed part, and the movable part is movable relative to the fixed part. The driving unit is configured to drive the movable part and the optical unit to move relative to the fixed part.

17 Claims, 12 Drawing Sheets

DRIVING MECHANISM

CROSS REFERENCE TO RELATED APPLICATIONS

This application claims priority of U.S. Provisional Application No. 63/332,424, filed Apr. 19, 2022, the entirety of which is incorporated by reference herein.

BACKGROUND OF THE INVENTION

Field of the Invention

The application relates in general to a driving mechanism, and in particular, to a variable aperture (VA) mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices to consumers.

Electronic devices that have image-capturing or video-recording functions normally include an optical module, and require functions of using an optical element driving mechanism to adjust the size of an aperture in order to change amount of light entering the module. Light may pass through the optical module and the optical element driving mechanism and may form an image on an optical sensor. However, the trend in modern mobile devices is to have a smaller size and a higher durability. As a result, how to effectively reduce the size of the optical module and how to increase its durability has become an important issue.

BRIEF SUMMARY OF INVENTION

In view of the aforementioned problems, the object of the invention is to provide a driving mechanism for moving an optical unit. The driving mechanism includes a fixed part, a movable part, and a driving unit. The movable part is movably connected to the optical unit and the fixed part. The driving unit is configured to impel the movable part and the optical unit relative to the fixed part.

In some embodiments, the driving unit comprises an SMA element that has a first length when the movable part is in a first position relative to the fixed part, and when a current signal is applied to the SMA element, the SMA element shrinks from a first length to a second length and impels the movable part from the first position to a second position relative to the fixed part.

In some embodiments the driving mechanism further includes a slider movably disposed on the movable part and connected to the SMA element, wherein the fixed part forms a longitudinal guiding structure, the slider contacts a first end of the guiding structure when the movable part is in the first position relative to the fixed part, and when the slider is impelled by the SMA element along the guiding structure from the first end to a second end of the guiding structure, the movable part is pushed by the slider from the first position to the second position.

In some embodiments, the guiding structure comprises a longitudinal slot.

In some embodiments, the fixed part has a polygonal shape, and a tilt angle is formed between the guiding structure and a side of the fixed part.

In some embodiments, the tilt angle is 45 degree.

In some embodiments, the movable part has an annular structure that forms a longitudinal rail, and the slider extends through the rail to the guiding structure.

In some embodiments, the rail extends in a first direction, and the guiding structure extends in a second direction that is not parallel to the first direction.

In some embodiments, the second direction is not perpendicular to the first direction.

In some embodiments, an included angle is formed between the first and second directions, and the included angle ranges from 20 degree to 70 degree.

In some embodiments, the driving mechanism further includes a housing and a smooth element, wherein the movable part and the fixed part are received in the housing, and the smooth element is disposed on an inner surface of the housing and faces the slider.

In some embodiments, the fixed part has a polygonal shape, and the slider is located close to a corner of the fixed part.

In some embodiments, the driving mechanism further includes a bottom plate that forms a longitudinal cavity, wherein the fixed part is located between the movable part and the bottom plate, and the slider extends through the movable part and the fixed part to the cavity.

In some embodiments, the longitudinal cavity is parallel to the guiding structure.

In some embodiments, the driving mechanism further includes a sensing assembly disposed on the movable part and the bottom plate for measuring the displacement of the movable part relative to the fixed part.

In some embodiments, the driving mechanism further includes a resilient element disposed on the fixed part, wherein the slider is located between the resilient element and the SMA element.

In some embodiments, the driving mechanism further includes a magnetic element disposed on the fixed part, wherein the SMA element is located between the magnetic element and the slider.

In some embodiments, the optical unit includes a first blade and a second blade pivotally connected to the fixed part for partially covering an opening of the fixed part, light enters the driving mechanism and propagates through the opening along an entry direction, and the first and second blades at least partially overlap when viewed along the entry direction.

In some embodiments, the optical unit further includes a third blade for partially covering the opening of the fixed part, and when viewed along the entry direction, the first and third blades at least partially overlap, and the second and third blades at least partially overlap.

In some embodiments, the driving mechanism further includes a protecting element, wherein the protecting element and the optical unit at least partially overlap when viewed along the entry direction.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
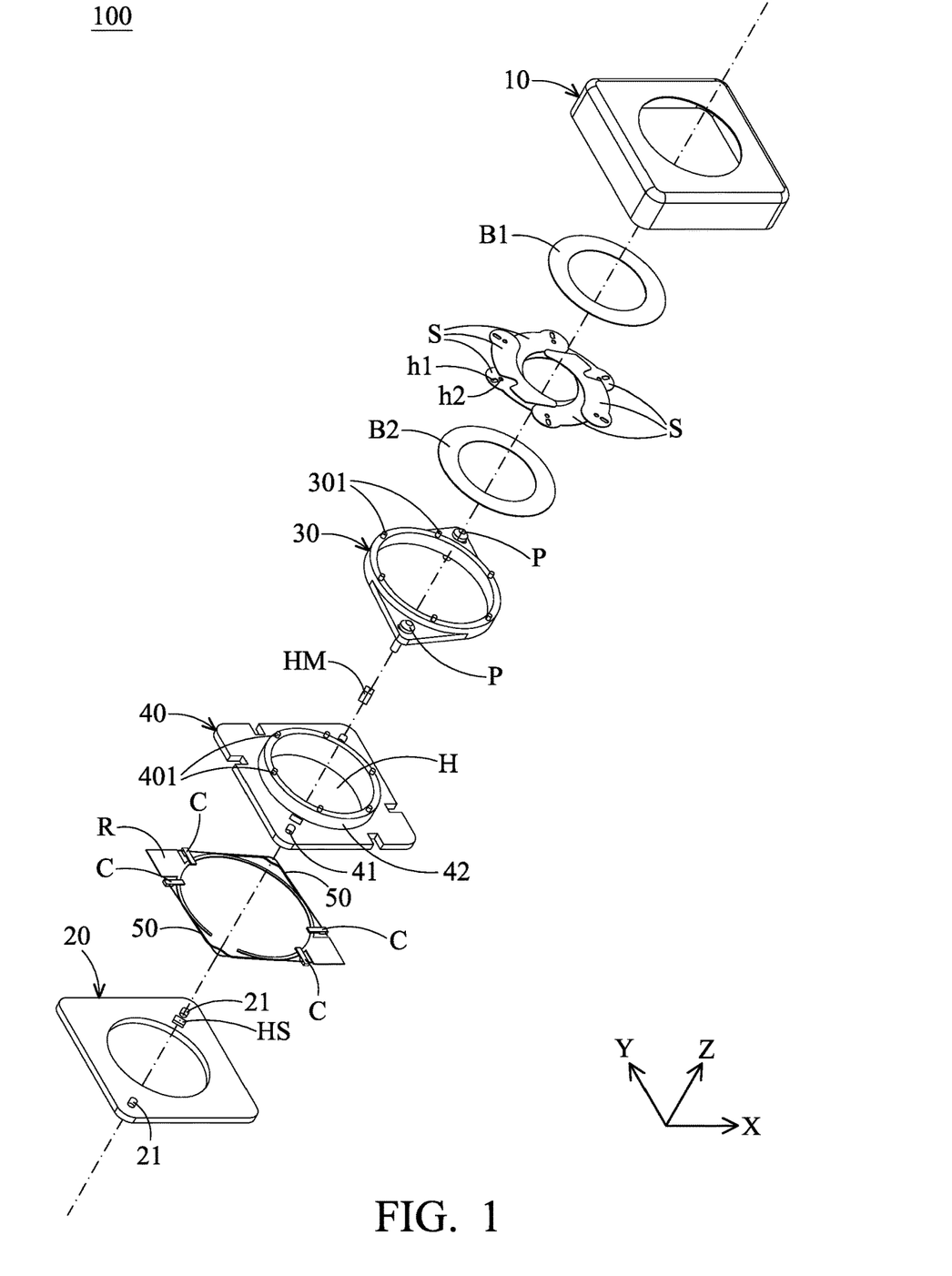
FIGS. 1 and 2 are exploded diagrams of a driving mechanism 100 in accordance with an embodiment of the invention.
Figure 2:
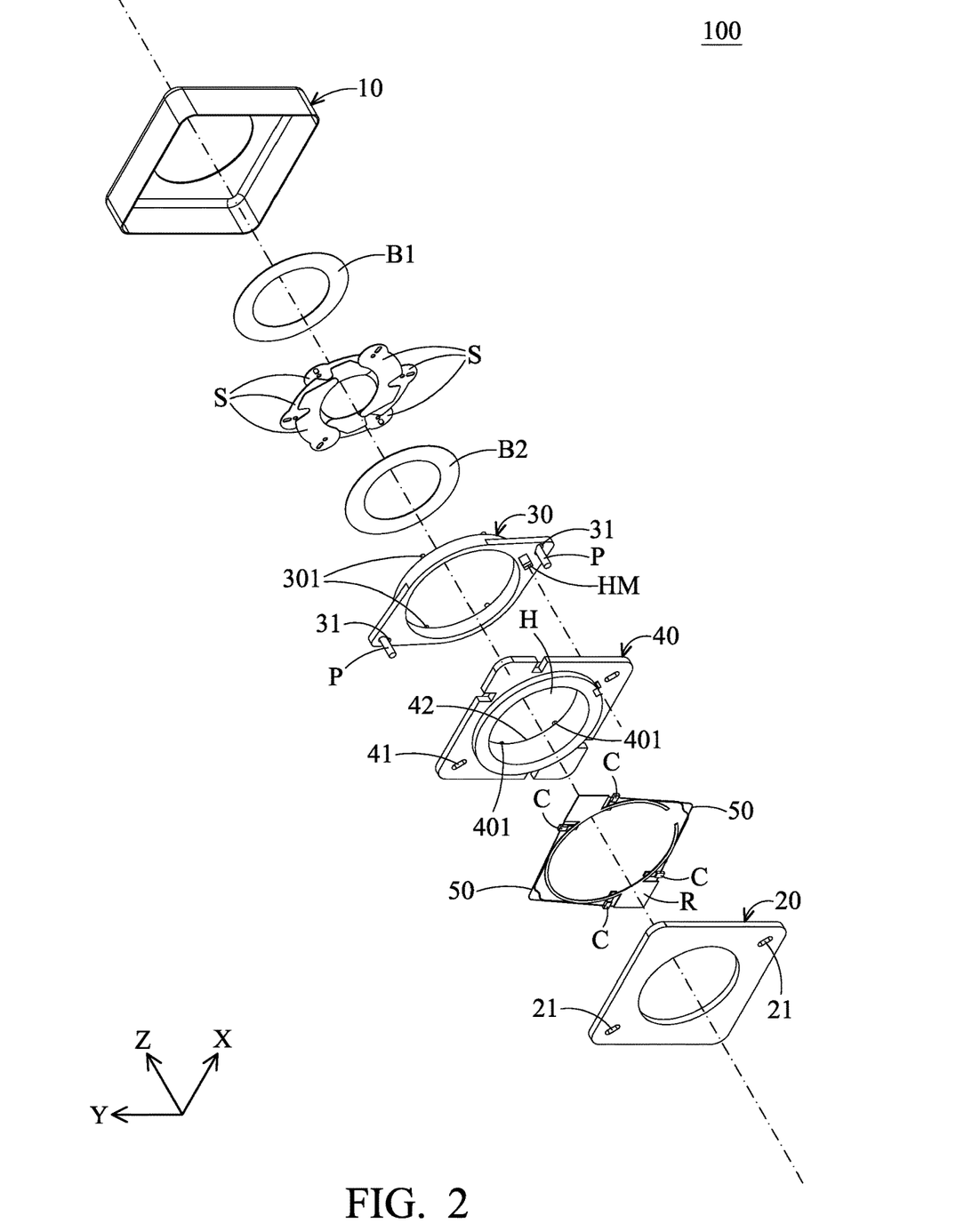
Figure 3:
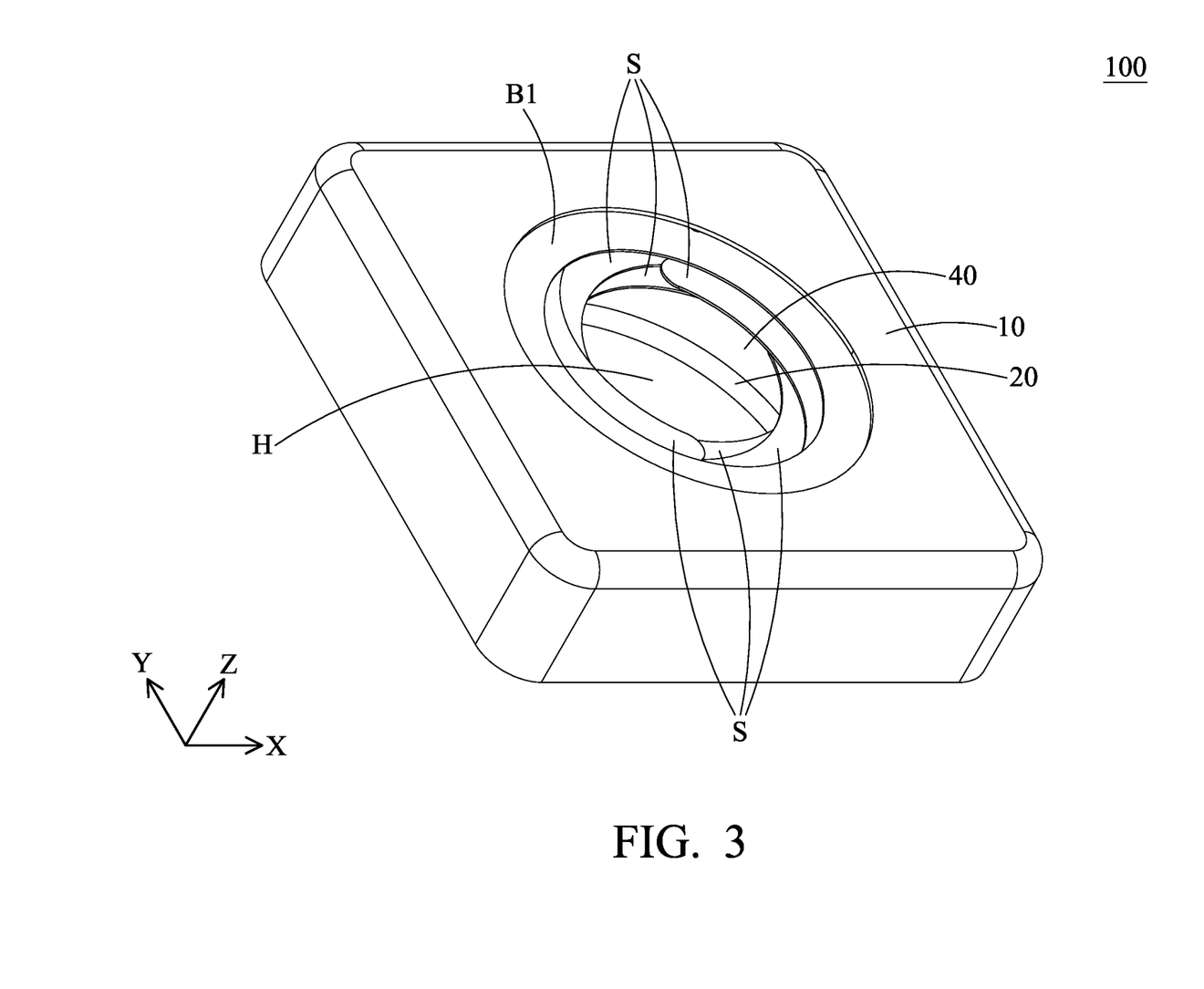
FIGS. 3 and 4 are perspective diagrams of the driving mechanism 100 in FIGS. 1 and 2.
Figure 4:
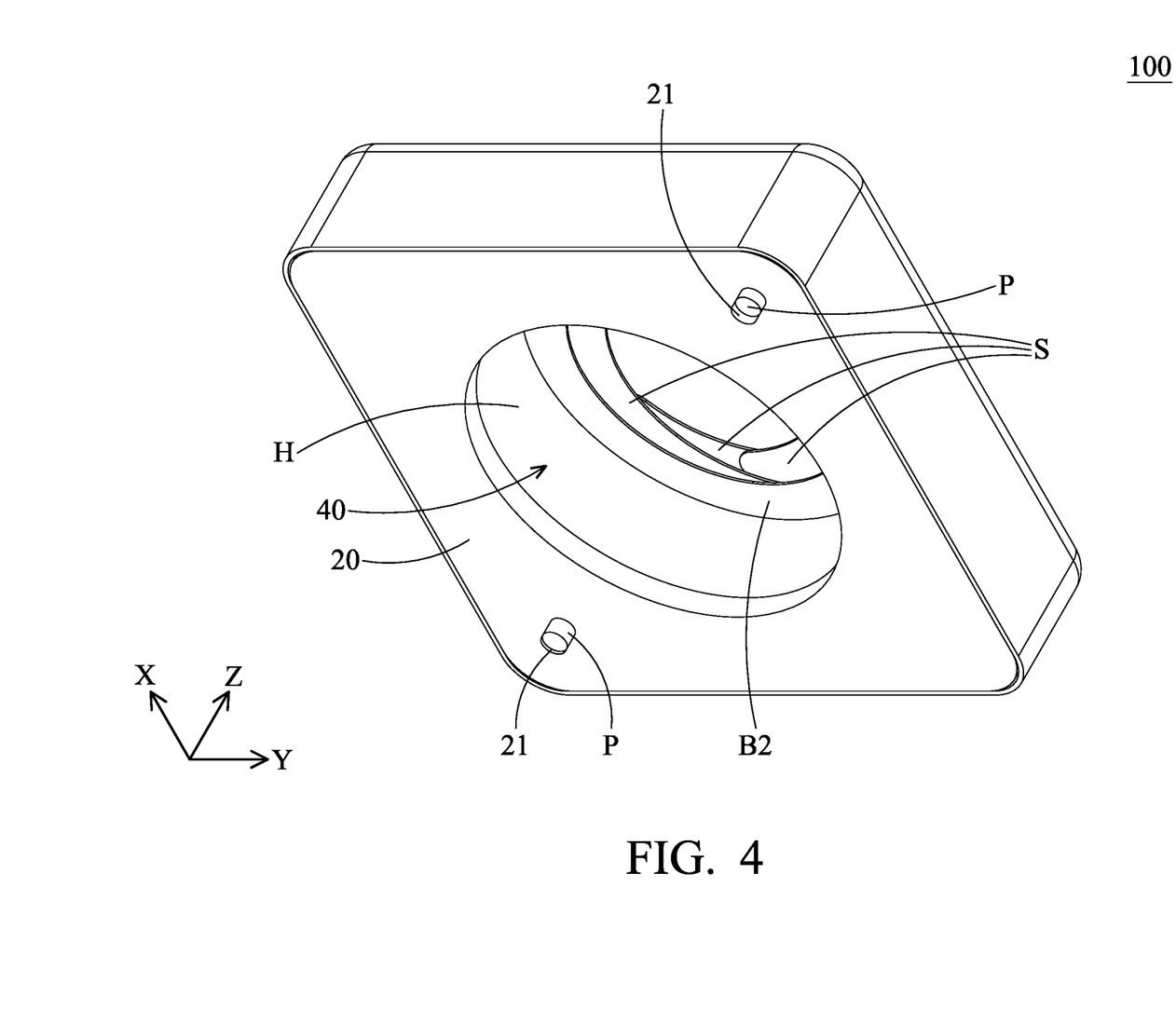
Figure 5:
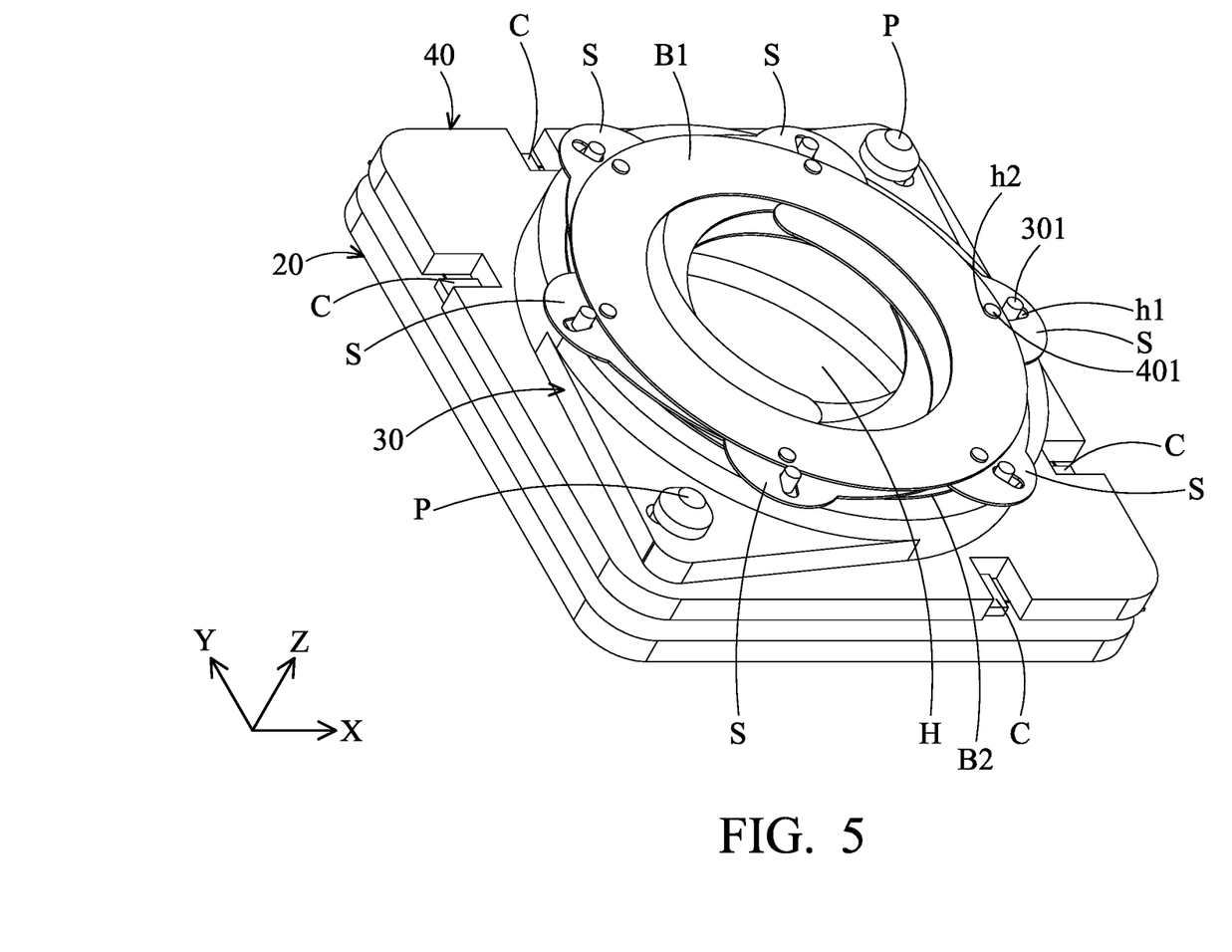
FIG. 5 is a perspective diagram of the driving mechanism 100 in FIG. 3 with the housing 10 omitted therefrom.
Figure 6:
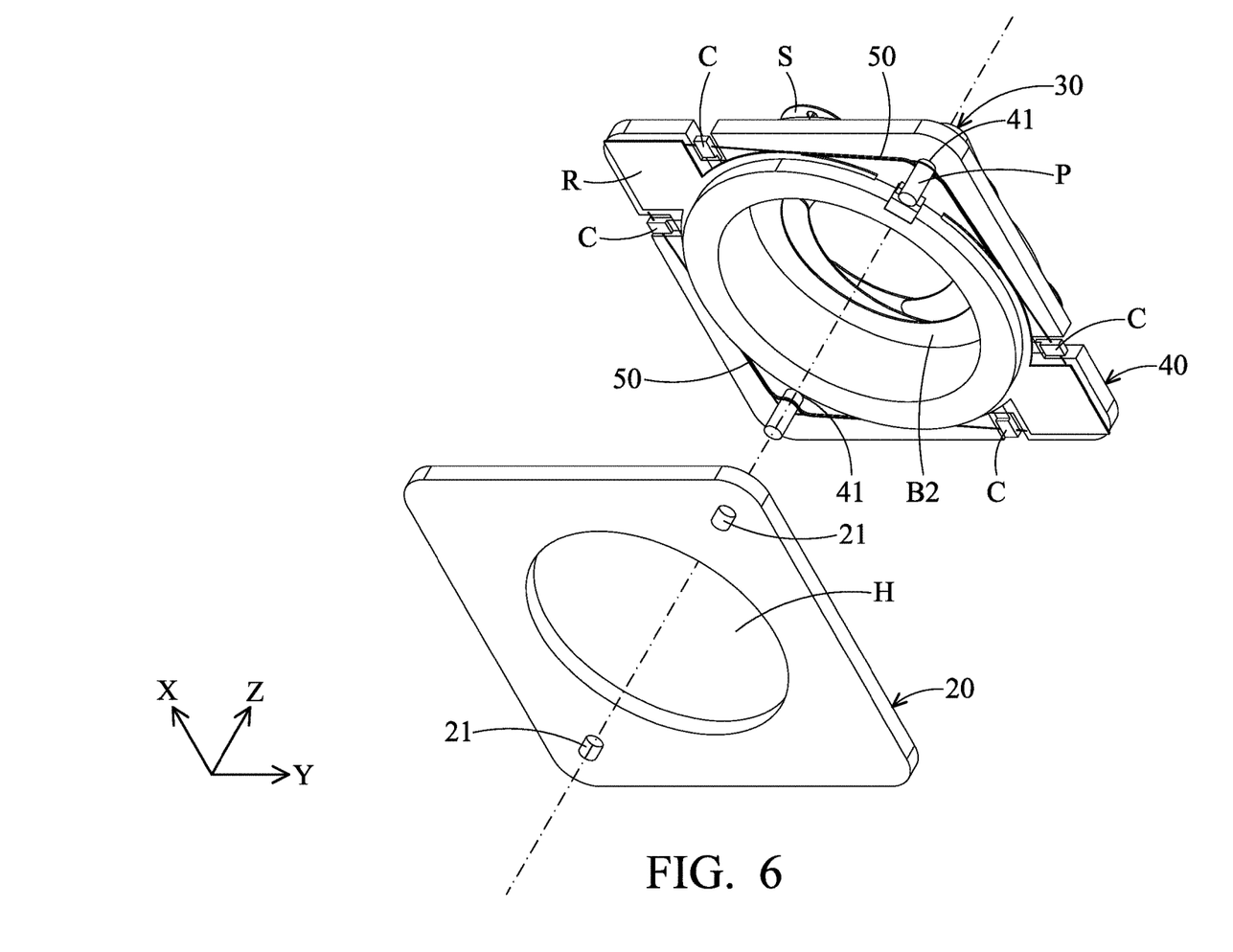
FIG. 6 is an exploded diagram of the driving mechanism 100 in FIG. 4 with the housing 10 omitted therefrom.

FIGS. 1 and 2 are exploded diagrams of a driving mechanism 100 in accordance with an embodiment of the invention. FIGS. 3 and 4 are perspective diagrams of the driving mechanism 100 in FIGS. 1 and 2. FIG. 5 is a perspective diagram of the driving mechanism 100 in FIG. 3 with the housing 10 omitted therefrom. FIG. 6 is an exploded diagram of the driving mechanism 100 in FIG. 4 with the housing 10 omitted therefrom.

As shown in FIGS. 1-6, an embodiment of a driving mechanism 100 primarily comprises a housing 10, two protecting elements B1, B2, several blades S, an annular movable part 30, at least a slider P, a fixed part 40, at least a driving unit 50, a resilient element R, a bottom plate 20, a sensing magnet HM, and a sensor HS.

The driving mechanism 100 in this embodiment may be a variable aperture (VA) mechanism. The movable part 30 is rotatably disposed around an annular flange 42 on the inner side of the fixed part 40. The blades S constitute an optical unit, and the hinges 301, 401 on the movable part 30 and the fixed part 40 extend through the holes h1, h2 of the blades S, whereby the blades S can rotate relative to the movable part 30 and the fixed part 40. The blades S are configured to partially cover an opening H at the center of the fixed part 40, so as to regulate the quantity of light through the driving mechanism 100.

The sensing magnet HM and the sensor HS constitute a sensing nodule, wherein the sensor HS is disposed on the bottom plate 20 (e.g. PCB), and the sensing magnet HM is disposed on the movable part 30 and extends through the fixed part 40. In this embodiment, the sensor HS is a Hall sensor that can measure the displacement of the movable part 30 relative to the fixed part 40 by detecting the sensing magnet HM.

The fixed part 40 has a polygonal shape (e.g. quadrilateral shape), and the slider P comprises a guide pin located close to a corner of the fixed part 40. During assembly, the slider P extends through the rail 31 and the guiding structure 41 of the movable part 30 and the fixed part 40 to the longitudinal cavity 21 of the bottom plate 20, wherein the cavity 21 is parallel to the guiding structure 41.

Here, the rail 31, the guiding structure 41, and the cavity 21 are all longitudinal slots respectively formed through the movable part 30, the fixed part 40, and the bottom plate 20.

The driving units 50 and the resilient element R are disposed at the bottom of the fixed part 40. Each of the driving units 50 comprises a shaped-memory alloy (SMA) element. In this embodiment, the driving unit 50 can be electrically connected to the bottom plate 20 (e.g. PCB) or external circuits via the conductive terminals C. The resilient element R may be a spring sheet, wherein the slider P are disposed between the driving unit 50 and the resilient element R.

It should be noted that the slider P can be driven by the driving unit 50 and the resilient element R to move back and forth along the rail 30 and the guiding structure 41. Therefore, rotation of the blades S and the movable part 30 can be controlled to appropriately regulate the quantity of light through the driving mechanism 100.

Still referring to FIGS. 1-6, two protecting elements B1, B2 are disposed on the top and bottom sides of the blades S, so as to block light and protect the blades S.

Figure 7:
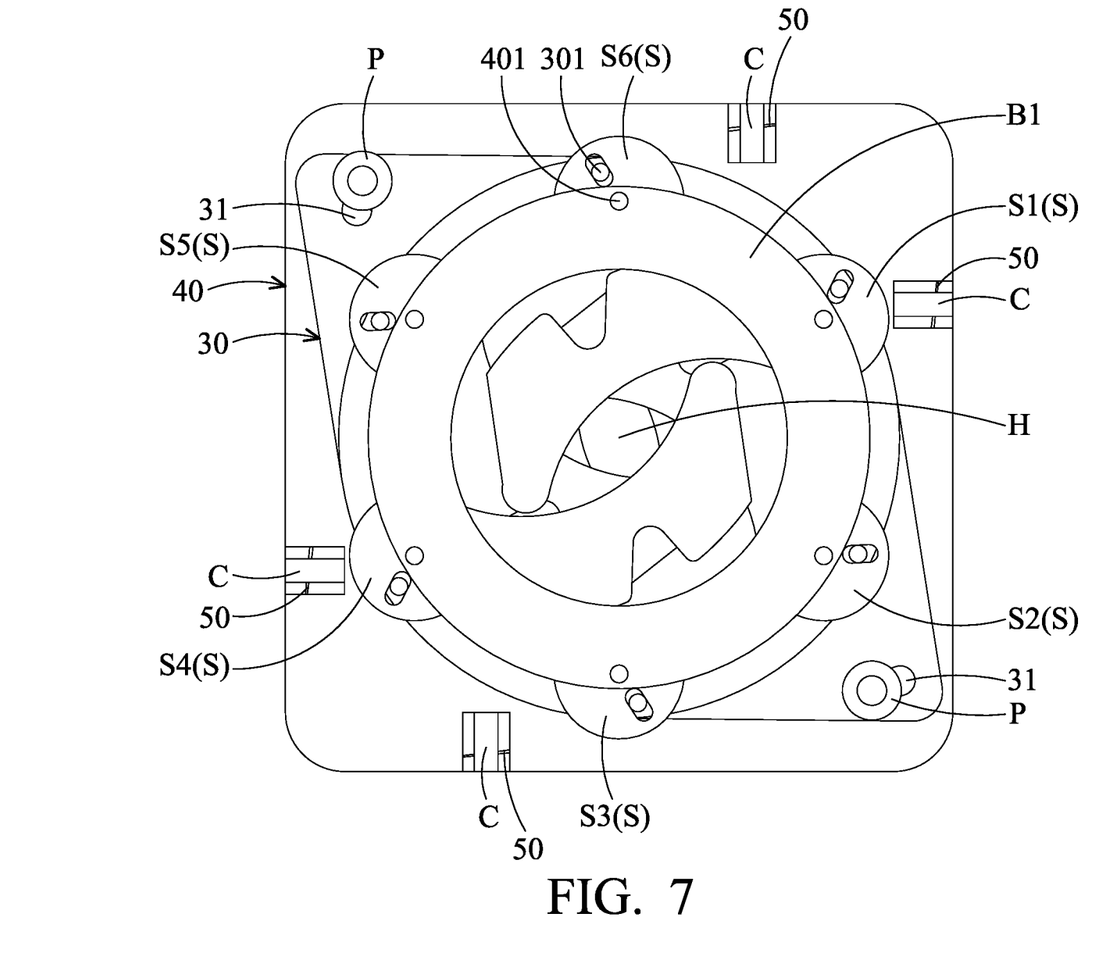
FIG. 7 is a schematic diagram showing that the blades S partially cover the opening H of the fixed part 40 when the movable part 30 in a first position relative to the fixed part 40.
Figure 8:
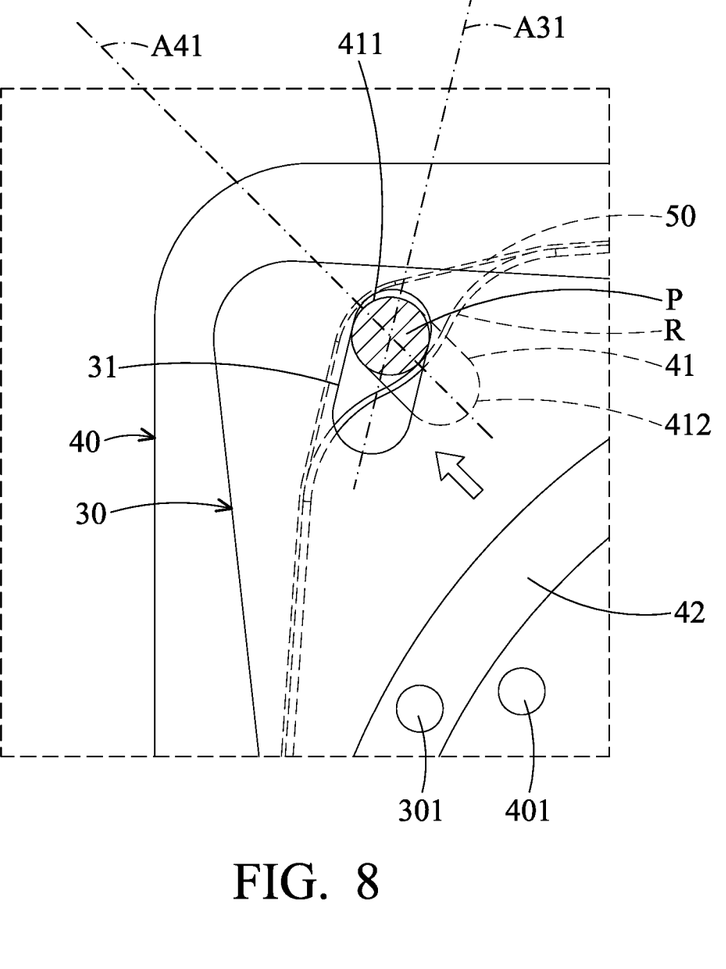
FIG. 8 is a schematic diagram showing that the slider P is at the first end 411 of the guiding structure 41 when the movable part 30 in the first position relative to the fixed part 40.

FIG. 7 is a schematic diagram showing that the blades S partially cover the opening H of the fixed part 40 when the movable part 30 in a first position relative to the fixed part 40. FIG. 8 is a schematic diagram showing that the slider P is at the first end 411 of the guiding structure 41 when the movable part 30 in the first position relative to the fixed part 40.

Referring to FIGS. 7 and 8, before a current signal is applied to the driving unit 50 (SMA element), the resilient element R can exert an outward spring force on the slider P that extends through the movable part 30 and the fixed part 40, whereby the slider P is in contact with and positioned at the first end 411 of the guiding structure 41 (FIG. 8). In this state, the movable part 30 can be held in a first position relative to the fixed part 40, and the driving unit 50 (SMA element) has a first length.

Figure 9:
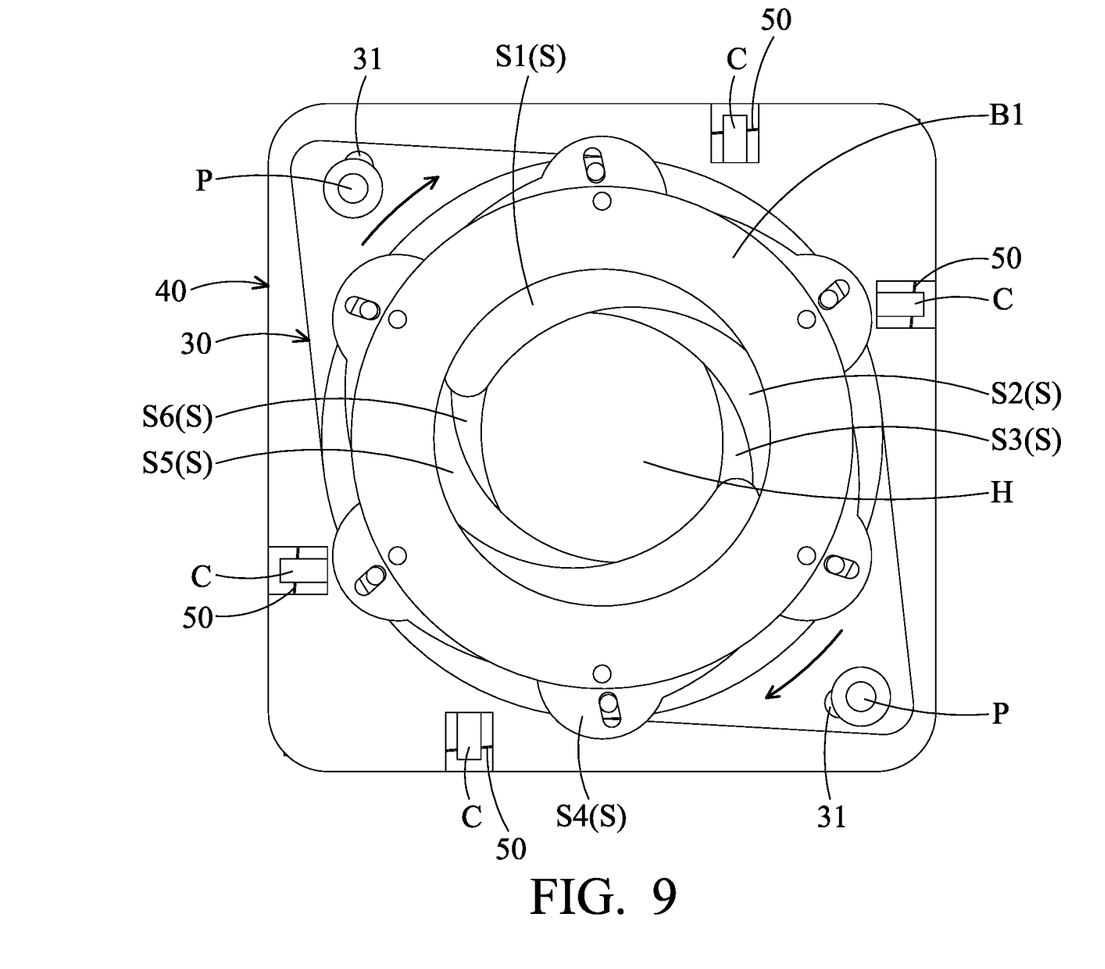
FIG. 9 is a schematic diagram showing that the movable part 30 rotates from the first position of FIG. 7 to a second position relative to the fixed part 40.
Figure 10:
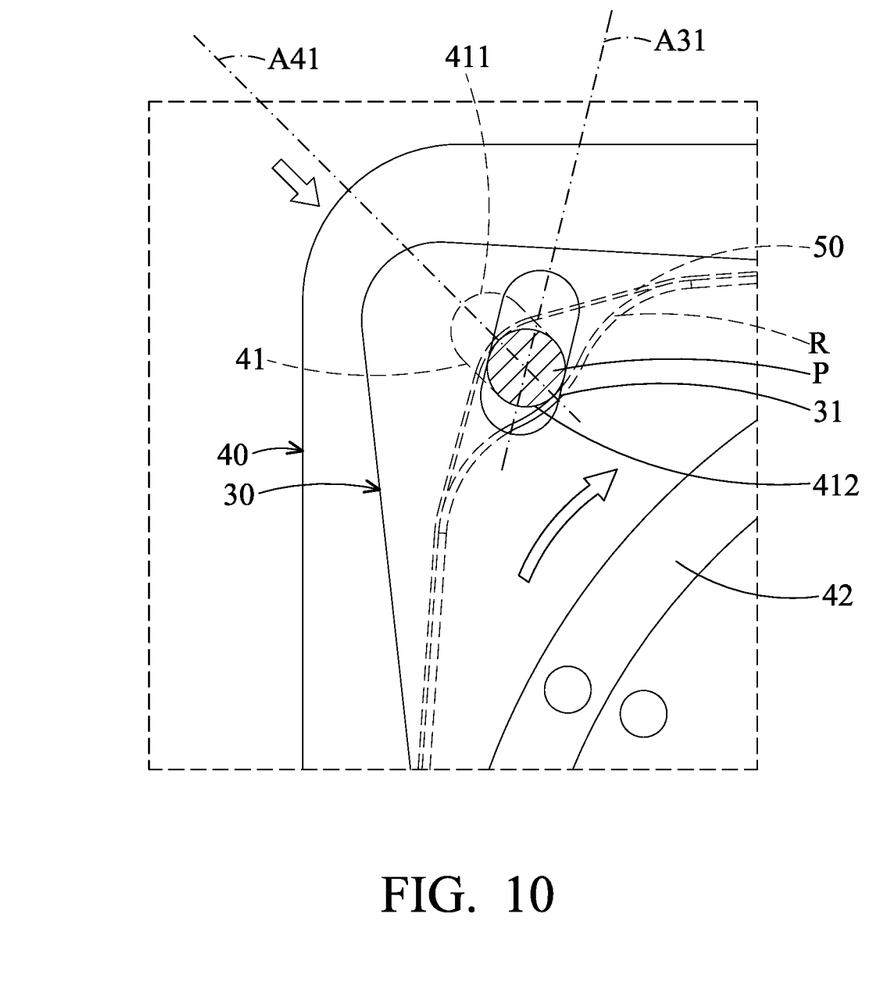
FIG. 10 is a schematic diagram showing that the slider P is at the second end 412 of the guiding structure 41 when the movable part 30 in the second position relative to the fixed part 40.

FIG. 9 is a schematic diagram showing that the movable part 30 rotates from the first position of FIG. 7 to a second position relative to the fixed part 40. FIG. 10 is a schematic diagram showing that the slider P is at the second end 412 of the guiding structure 41 when the movable part 30 in the second position relative to the fixed part 40.

Referring to FIGS. 9 and 10, the driving unit 50 (SMA element) shrinks from the first length to a second length when a current signal is applied thereto. In this state, the driving unit 50 can exert a shrinkage force on the slider P that extends through the movable part 30 and the fixed part 40. As a result, the slider P slides from the first end 411 along the guiding structure 41 to contact the second end 412, as the arrow indicates in FIG. 10. Moreover, the movable part 30 moves from the first position to the second position relative to the fixed part 40, and the blades S rotate relative to the movable part 30 and the fixed part 40, thus increasing the quantity of light through the driving mechanism 100.

It should be noted that the central axis A41 of the guiding structure 41 extends along a first direction and has a tilt angle (e.g. 45 degree) relative to a side of the fixed part 40. Specifically, the central axis A31 of the rail 31 extends along a second direction that is neither parallel nor perpendicular to the first direction.

In this embodiment, the included angle between the first and second directions ranges from 20 degree to 70 degree. It can be seen in FIGS. 7-10 that the distance between the first end 411 to the center of the opening H is further than the distance between the second end 412 to the center of the opening H.

As shown in FIGS. 7 and 9, the blades S (optical unit) include a first blade S1, a second blade S2, a third blade S3, a fourth blade S4, a fifth blade S5, and a sixth blade S6. Light can enter the driving mechanism 100 along an entry direction and propagate through the opening H. When viewed along the entry direction (Z direction), the first and second blades S1, S2 at least partially overlap, the first and third blades S1, S3 at least partially overlap, and the second and third blades S2, S3 at least partially overlap. Moreover, when viewed along the entry direction (Z direction), both of the protecting elements B1 and B2 at least partially overlap each one of the blades S.

Figure 11:
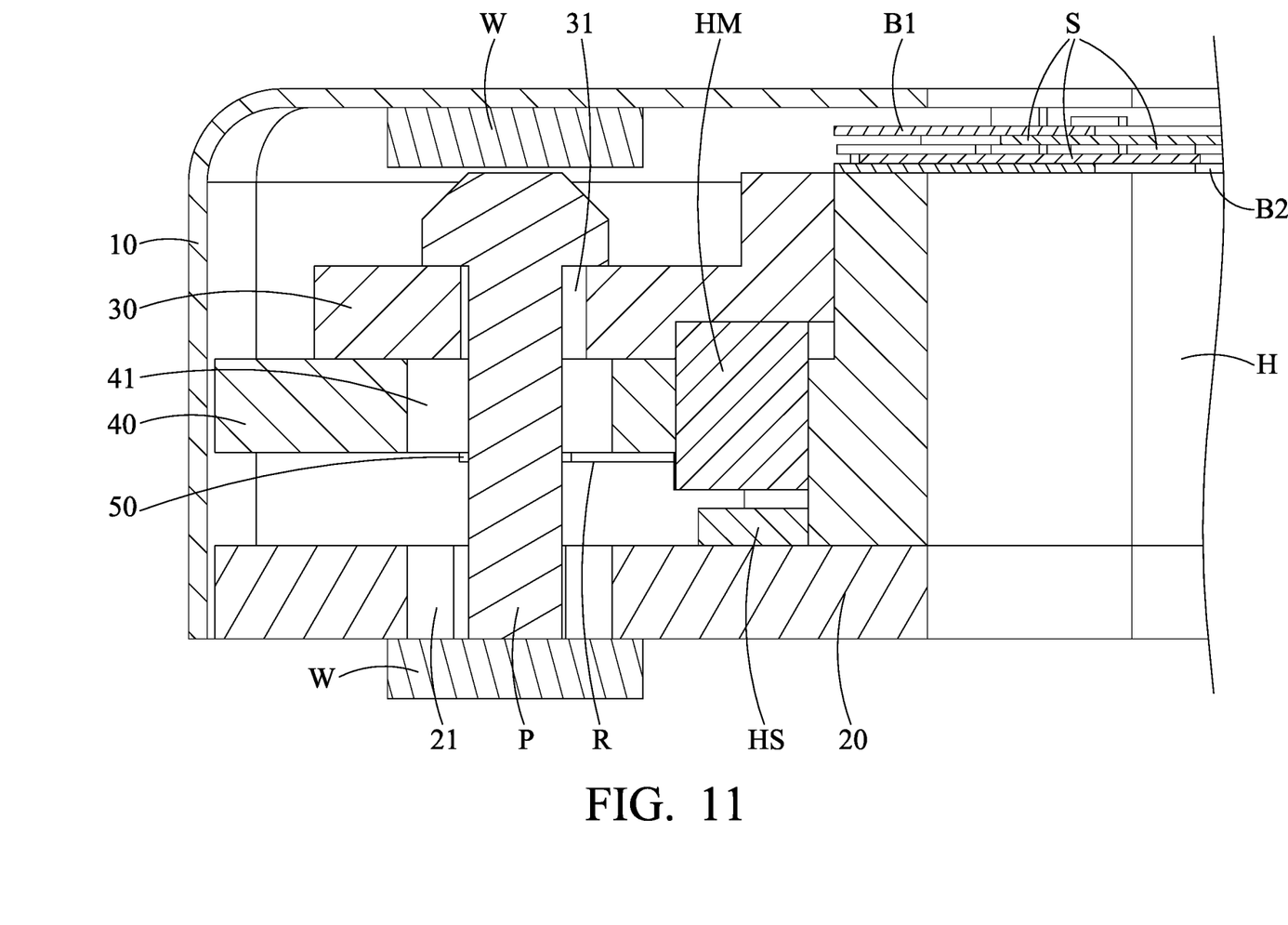
FIG. 11 is an enlarged partial cross-sectional view of the driving mechanism 100.

FIG. 11 is an enlarged partial cross-sectional view of the driving mechanism 100.

As shown in FIG. 11, the sensing magnet HM and the sensor HS constitute a sensing nodule, wherein the sensor HS is disposed on the bottom plate 20 (e.g. PCB), and the sensing magnet HM is disposed on the movable part 30 and extends through an opening of the fixed part 40. In this embodiment, the sensor HS is a Hall sensor that can detect the sensing magnet HM to measure the displacement of the movable part 30 relative to the fixed part 40.

Additionally, FIG. 11 shows that the movable part 30 and the fixed part 40 are both disposed in the housing 10, wherein a smooth element W is disposed on the inner surface of the housing 10 and located adjacent to the slider P.

It should be noted that the smooth element W may be in contact with or spaced apart from the slider P. When the slider P moves along the rail 31 and the guiding structure 41, the slider P can also slide on a smooth surface of the smooth element W, thereby preventing tilt of the slider P relative to the movable part 30 and the fixed part 40.

Figure 12:
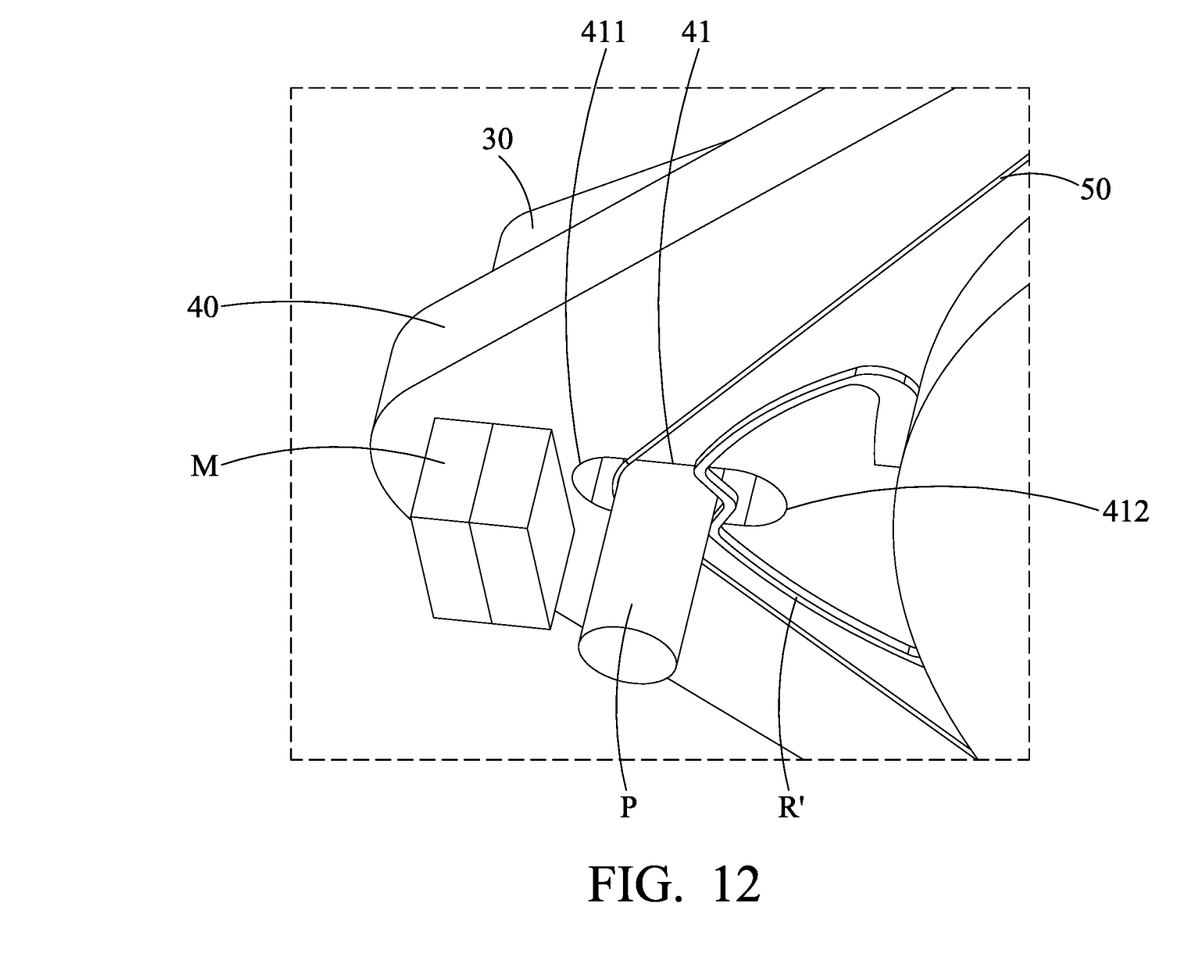
FIG. 12 is a partial perspective diagram showing a magnetic element M and a heart-shaped spring R' disposed on the outer and inner sides of the slider P.

FIG. 12 is a partial perspective diagram showing a magnetic element M and a heart-shaped spring R' disposed on the outer and inner sides of the slider P.

In another embodiment, the resilient element R may be replaced by the magnetic element M or the heart-shaped spring R', as shown in FIG. 12. The magnetic element M (e.g. magnet) may be affixed to the fixed part 40 or the bottom plate 20, and the driving unit 50 (SMA element) is located between the magnetic element M and the slider P. The magnetic element M can exert a magnetic force on the slider P (e.g. metal guide pin) toward the outside of the driving mechanism 100, whereby the slider P can be positioned at the first end 411 of the guiding structure 41.

In summary, the invention provides a driving mechanism 100 that comprises a driving unit 50 (SMA element) for impelling the slider P along the guiding structure 41. Thus, the blades S and the movable part 30 can be driven to rotate relative to the fixed part 40, whereby the quantity of light through the driving mechanism 100 can be effectively regulated. Moreover, miniaturization of the driving mechanism 100 (e.g. variable aperture mechanism) can also be achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical unit, comprising:
   a fixed part;
   a movable part, movably connected to the optical unit and the fixed part; and
   a driving unit, configured to impel the movable part and the optical unit relative to the fixed part, wherein the driving unit comprises an SMA element that has a first length when the movable part is in a first position relative to the fixed part, and when a current signal is applied to the SMA element, the SMA element shrinks from a first length to a second length and impels the movable part from the first position to a second position relative to the fixed part;

a slider, movably disposed on the movable part and connected to the SMA element, wherein the fixed part forms a longitudinal guiding structure, the slider contacts a first end of the guiding structure when the movable part is in the first position relative to the fixed part, and when the slider is impelled by the SMA element along the guiding structure from the first end to a second end of the guiding structure, the movable part is pushed by the slider from the first position to the second position;

a housing, wherein the movable part and the fixed part are received in the housing; and a smooth element, disposed on an inner surface of the housing and facing the slider.

2. The driving mechanism as claimed in claim 1, wherein the guiding structure comprises a longitudinal slot.

3. The driving mechanism as claimed in claim 2, wherein the fixed part has a polygonal shape, and a tilt angle is formed between the guiding structure and a side of the fixed part.

4. The driving mechanism as claimed in claim 3, wherein the tilt angle is 45 degree.

5. The driving mechanism as claimed in claim 1, wherein the movable part has an annular structure with a longitudinal rail formed on it, and the slider extends through the rail to the guiding structure.

6. The driving mechanism as claimed in claim 5, wherein the rail extends in a first direction, and the guiding structure extends in a second direction that is not parallel to the first direction.

7. The driving mechanism as claimed in claim 6, wherein the second direction is not perpendicular to the first direction.

8. The driving mechanism as claimed in claim 7, wherein an included angle is formed between the first and second directions, and the included angle ranges from 20 degree to 70 degree.

9. The driving mechanism as claimed in claim 1, wherein the fixed part has a polygonal shape, and the slider is located close to a corner of the fixed part.

10. The driving mechanism as claimed in claim 1, further comprising a resilient element disposed on the fixed part, wherein the slider is located between the resilient element and the SMA element.

11. The driving mechanism as claimed in claim 1, wherein the optical unit includes a first blade and a second blade pivotally connected to the fixed part for partially covering an opening of the fixed part, light enters the driving mechanism and propagates through the opening along an entry direction, and the first and second blades at least partially overlap when viewed along the entry direction.

12. The driving mechanism as claimed in claim 11, wherein the optical unit further includes a third blade for partially covering the opening of the fixed part, and when viewed along the entry direction, the first and third blades at least partially overlap, and the second and third blades at least partially overlap.

13. The driving mechanism as claimed in claim 11, further comprising a protecting element, wherein the protecting element and the optical unit at least partially overlap when viewed along the entry direction.

14. A driving mechanism for moving an optical unit, comprising:

a fixed part;

a movable part, movably connected to the optical unit and the fixed part;

a driving unit, configured to impel the movable part and the optical unit relative to the fixed part, wherein the driving unit comprises an SMA element that has a first length when the movable part is in a first position relative to the fixed part, and when a current signal is applied to the SMA element, the SMA element shrinks from a first length to a second length and impels the movable part from the first position to a second position relative to the fixed part;

a slider, movably disposed on the movable part and connected to the SMA element, wherein the fixed part forms a longitudinal guiding structure, the slider contacts a first end of the guiding structure when the movable part is in the first position relative to the fixed part, and when the slider is impelled by the SMA element along the guiding structure from the first end to a second end of the guiding structure, the movable part is pushed by the slider from the first position to the second position; and a bottom plate, forming a longitudinal cavity, wherein the fixed part is located between the movable part and the bottom plate, and the slider extends through the movable part and the fixed part to the cavity.

15. The driving mechanism as claimed in claim 14, wherein the longitudinal cavity is parallel to the guiding structure.

16. The driving mechanism as claimed in claim 14, further comprising a sensing assembly disposed on the movable part and the bottom plate for measuring the displacement of the movable part relative to the fixed part.

17. A driving mechanism for moving an optical unit, comprising:

a fixed part;

a movable part, movably connected to the optical unit and the fixed part;

a driving unit, configured to impel the movable part and the optical unit relative to the fixed part, wherein the driving unit comprises an SMA element that has a first length when the movable part is in a first position relative to the fixed part, and when a current signal is applied to the SMA element, the SMA element shrinks from a first length to a second length and impels the movable part from the first position to a second position relative to the fixed part;

a slider, movably disposed on the movable part and connected to the SMA element, wherein the fixed part forms a longitudinal guiding structure, the slider contacts a first end of the guiding structure when the movable part is in the first position relative to the fixed part, and when the slider is impelled by the SMA element along the guiding structure from the first end to a second end of the guiding structure, the movable part is pushed by the slider from the first position to the second position; and a magnetic element, disposed on the fixed part, wherein the SMA element is located between the magnetic element and the slider.

* * * * *